May 22, 1956  B. G. PRICE  2,746,160
CALIPER HAVING MAGNETICALLY CONTROLLED RECORDER
Filed June 6, 1955
FIG. 1.
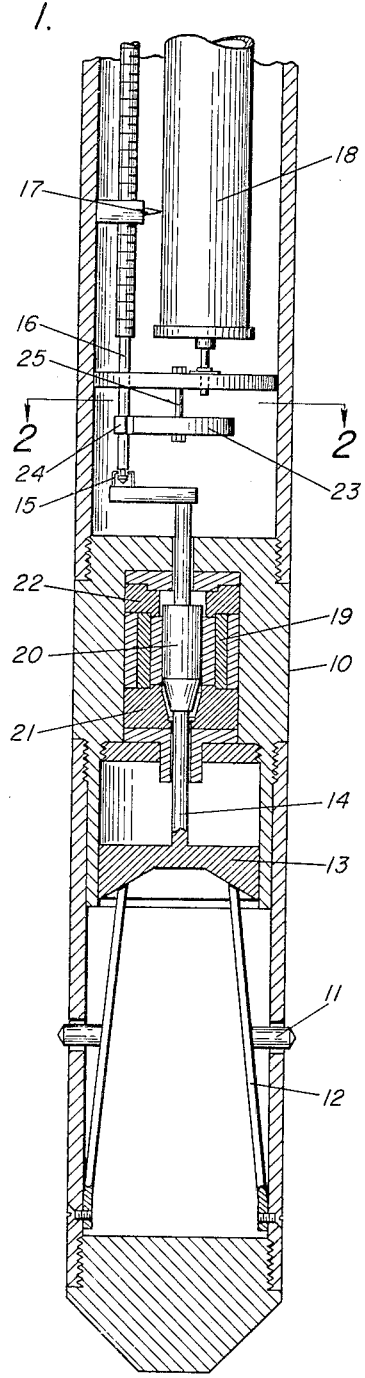
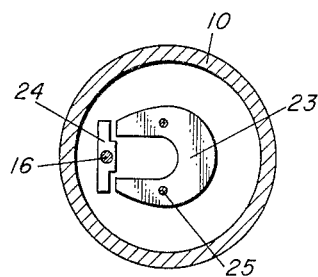
FIG. 2.
INVENTOR.
Berry G. Price,
BY
Thomas O Arnold
ATTORNEY.

United States Patent Office 2,746,160
Patented May 22, 1956

2,746,160

CALIPER HAVING MAGNETICALLY CONTROLLED RECORDER

Berry G. Price, Houston, Tex., assignor to Tuboscope Company, Harris County, Tex., a corporation of Delaware Application June 6, 1955, Serial No. 513,536

2 Claims. (Cl. 33—178)

This invention relates to geometrical measuring instruments and more particularly to mechanical calipers for detecting pits and corrosion in tubing in oil wells.

Tubing calipers for detecting pits are now well developed. In general, such calipers include a system of feelers or fingers spring-pressed into engagement with the inside of the tubing and a recording mechanism for marking on a chart in response to movement of the feelers as the assembly is pulled through the tubing.

It has been common practice, as disclosed in the patent to Chaney and Barnes No. 2,518,663, to employ a compression spring on the stylus rod of the recording mechanism of such mechanical tubing calipers, the stylus spring opposing the action of the feeler springs but being weaker than the feeler springs.

A stylus spring, like any other spring, exerts a variable force depending upon how much it is compressed. Accordingly, when the feelers of the tubing calipers of the prior art engage pits of shallow depth, the stylus spring opposes their movement with one force, and when the feelers engage pits of greater depth, the stylus spring opposes their movement with a greater force.

One purpose in having a force exerted on the stylus rod in such calipers, in opposition to that exerted by the feeler springs, is to prevent the stylus rod from bouncing around due partly to vibratory forces resulting from movement of the instrument through the well, and due also to inertia forces or "over-kicks" of the feeler springs, especially when a number of feelers enter pits at the same time, "over-kicks" cause false markings on the chart. In overcoming these "over-kicks," the stylus spring cannot function properly because the force it exerts is variable and increasing at the wrong time. The forces of the feeler springs become weaker in deeper pits, whereas the opposing force of the stylus spring becomes stronger as the feelers enter deeper pits, yet the factors causing the false markings on the chart remain approximately the same whether the feelers be in deep pits or shallow pits.

It is an object of the present invention to devise multiple feeler, mechanical, recording calipers for use in tubing in oil wells or the like, in which forces exerted on the stylus of the recorder either decrease or remain substantially constant, as the feeler spring forces decrease, when the feelers of the caliper encounter areas of pitting or corrosion in the tubing.

To carry out the objects of the invention, a complicated system of permanent magnets is employed. These function entirely differently than either a compression or a tension spring. They are specially designed to exert forces which control the stylus in such a way as to avoid "over-kicks" on the chart to a considerable extent, and still permit the recording of variations in internal configuration of the tubing.

Unlike the tubing caliper of the Chaney and Barnes Patent #2,518,663, calipers built in accordance with the present invention do not record the depth of the deepest pit in the tubing. The calipers of the present invention show areas of pitting or corrosion, rather than the depth of the deepest pit. The force of an individual feeler spring does not constantly exert a greater force than the opposing forces exerted by the magnets. In some cases it is advantageous to record only the depth of the deepest pits in a given area in tubing, and the device of the Chaney-Barnes patent mentioned is designed for that purpose. In other cases, it is more advantageous to locate areas of corrosion or pitting, since it is there that the tubing is most likely to part, rather than attempt to measure the depth of individual pits. It is in the latter field that the present invention is directed.

Other objects and advantages reside in certain novel features of the invention as will be apparent from the following description, taken in connection with the accompanying drawings, in which:

Figure 1 is a fragmentary view in vertical cross-section, and somewhat diagrammatic, of a tubing caliper constructed in accordance with the present invention, and Figure 2 is a transverse cross-sectional view of the caliper of Figure 1, taken on the line 2—2 thereof.

Referring to the drawing in detail, it will be seen that the caliper there illustrated includes a housing 10 which has a number of feelers 11 mounted at its lower end on feeler springs 12.

In accordance with known practices, as illustrated, for example in the patent to M. M. Kinley and J. C. Kinley No. 2,665,187, Fig. 1, a cone 13 rides upon the tips of the feeler springs 12. Through the rod 14, latch 15 and threaded rod 16, a stylus 17 is caused to inscribe a record on the chart 18. This mechanism is all well known and need not be described here, it being understood that as the housing 10 and the mechanism therein are pulled through the tubing, as by a measuring line, means is provided to rotate the chart 18 and the stylus rod 16 to make a record of the feeler movement upon the chart 18.

In accordance with the present invention magnets are employed to exert downward forces on the stylus rod 16 and the cone 13 to prevent these parts from bouncing around unduly. Two permanent magnets made of Alnico or the like are here illustrated.

One of these magnets is shown at 19. It is cylindrical in shape and is mounted in the housing 10 so as to surround the rod 14. The rod 14, which is made of non-magnetic material, carries a cylindrical armature 20, as illustrated, which has a tapered portion at its lower end. The armature 20 may be made of Armco ingot iron.

Above and below the magnet 19, two pole pieces 21 and 22 are provided. The shape of these pole pieces is such that a strong downward pull is exerted by the magnet 19 upon the armature 20 when the parts are in the position illustrated, but when the feeler springs 12 push the cone 13 and the rod 14 upwardly the magnetic pull on the armature decreases. This action is thus different than that of a spring. A spring would exert an increasing force upon the cone 13 as it moved upwardly.

As explained above, the force exerted by the feeler springs 12 decreases as they expand into corroded tubing. Hence, the pull exerted by the magnet 19 decreases when the push of the feeler springs decreases and the pull increases when the feeler springs push with a greater force, so that relatively the push and pull remain approximately constant. Scientifically speaking, this is not accurate, since the magnetic pull between the magnet 19 and its armature 20 is not a linear function, but as a practical matter the relationship indicated holds true.

In addition to the above described cylindrical magnet, a horse-shoe magnet 23 is mounted in the housing to exert a pull upon an armature 24 secured to the stylus rod 16. The magnet 23 may be bolted to a disk in the housing, as shown at 25, to support it.

Figure 2 shows the shape of the magnet 23 and its armature 24. It will be observed that the armature is arranged so that it travels up and down with the stylus rod 16 across the poles of the magnet. Since the magnet exerts a strong lateral pull upon the armature, bearings should be provided to hold it properly spaced, but these bearings, as well as those which guide the rod 14 through the cylindrical magnet 19 have not been shown in the drawing, since such devices are well known to those skilled in the art.

The vertical pull between the magnet 23 and the armature 24 varies in a manner quite different from that of the magnet 19 and its armature 20. If the armature 24 is exactly at the same vertical position as the poles of the magnet 23, as illustrated, when the feelers 11 are in smooth tubing having no pits or corrosion, no vertical pull whatever is exerted by the magnet 23. As the feelers move out and the cone 13 rises, the pull exerted by the magnet 23 increases for a slight distance, and then it decreases for the remainder of the distance of upward travel of the armature 24. The magnitude of this pull and the point of travel at which it starts to decrease instead of increase can be controlled by varying the dimensions of the magnet and armature and by varying the vertical location of the armature 24 upon the rod 16 or by raising or lowering the magnet 23 on the bolts 25.

The bolts 25, the housing 10 and the other structure near the magnets 19 and 23 should, of course, be made of non-magnetic material.

With a tubing caliper constructed as illustrated, it will be seen that the magnetic pull downwardly upon the stylus assembly is of a compound nature, being the sum, at any point of travel of the assembly, of the pull of each magnet individually.

If desired, the sum of the magnetic pulls can be caused to remain substantially constant during the movement of the stylus assembly, or these magnetic forces may be caused to decrease as the stylus assembly is moved upwardly, so as to more nearly remain in balance with the forces exerted by the feeler springs.

As actually constructed in calipers being placed in the field, the sum of the forces exerted by the magnets is such that, when added to the weight of the stylus assembly, a single feeler spring 12 is incapable of exerting an opposing force sufficient to cause the stylus 17 to record a deep pit. Two or more feeler springs will cause such movement. The instrument does not measure the depth of the deepest pit but responds to areas of pitting, corrosion, rod wear or the like in tubing.

While only one embodiment has been shown and described herein, it is obvious that various changes may be made without departing from the spirit of the invention or the scope of the annexed claims.

I claim:

1. In a caliper of the class described, a housing adapted to be moved through tubing, feelers for engaging the inside of the tubing, feeler springs for urging the feelers outwardly, a cone mounted in the housing to respond to movement of the feelers, recording mechanism including a stylus moved by the cone, and magnets for preventing bounce of the stylus and for causing the stylus to record inside of the tubing, feeler springs for urging the feelers by the feelers, at least one of said magnets being of cylindrical shape and having an armature mounted for movement therein and so arranged as to exert a decreasing force upon the stylus as the feelers move outwardly into pits or corrosion in the tubing.

2. In a caliper of the class described, a housing adapted to be moved through tubing, feelers for engaging the inside of the tubing, feeler springs for urging the feelers outwardly, a cone mounted in the housing to respond to movement of the feelers, recording mechanism including a stylus moved by the cone, and magnets for preventing bounce of the stylus and for causing the stylus to record areas of pitting or corrosion in the tubing encountered by the feelers, one of said magnets being of cylindrical shape and having an armature mounted for movement therein and the other of said magnets being of horse-shoe shape and having an armature mounted for movement across the poles thereof, the arrangement being such that the sum of the forces exerted by the magnets does not increase as the feelers enter pits or corrosion in the tubing.

No references cited.